Jan. 20, 1959 R. GUENTHER 2,870,260
SPEECH INTERPOLATION COMMUNICATION SYSTEM
Filed Nov. 4, 1955
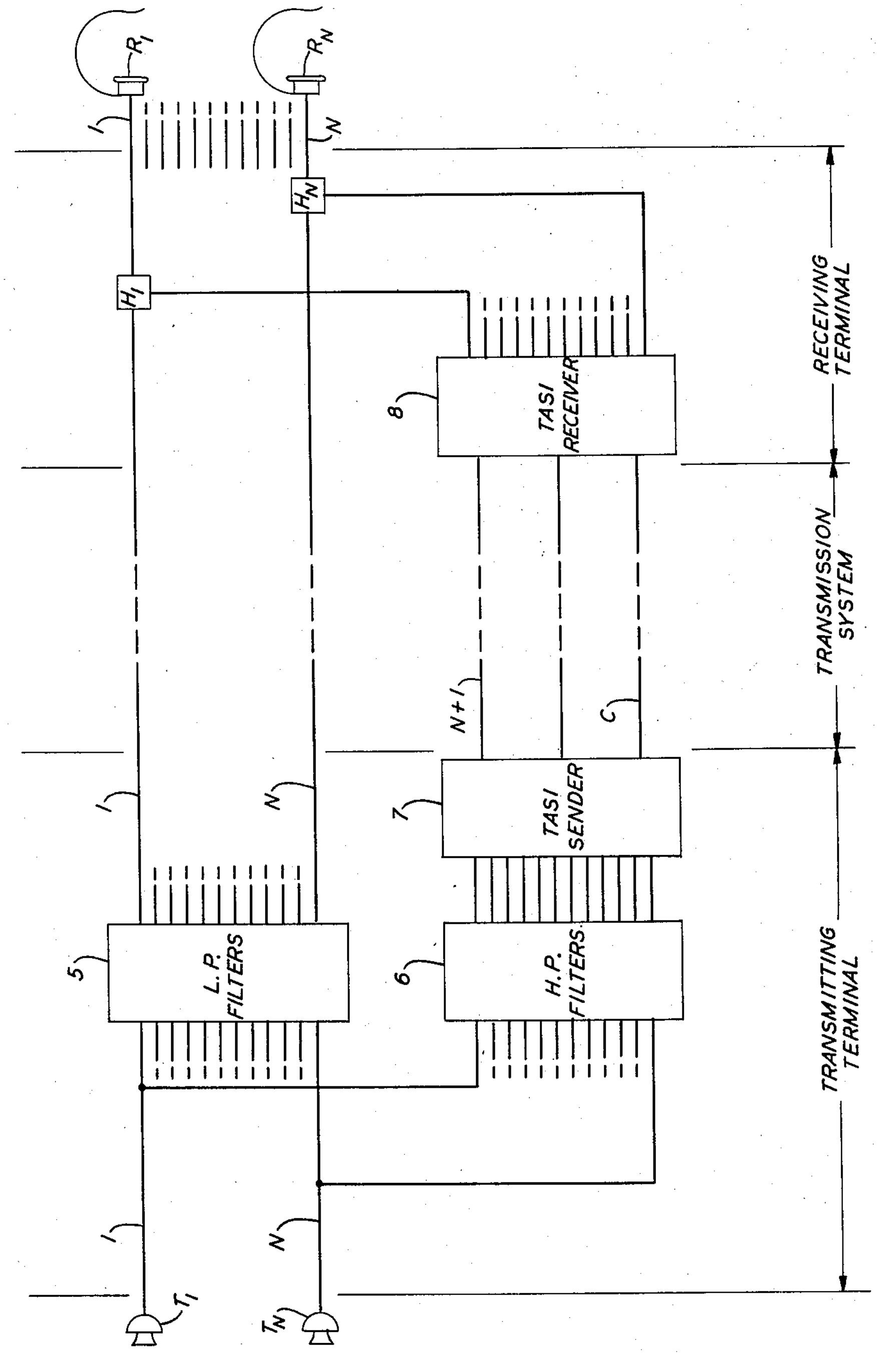
INVENTOR
RICHARD GUENTHER
BY W.L. Keefauver
ATTORNEY

United States Patent Office 2,870,260

Patented Jan. 20, 1959

2,870,260

SPEECH INTERPOLATION COMMUNICATION SYSTEM

Richard Guenther, Chatham, N. J., assignor to Bell Telephone Laboratories, Incorporated, New York, N. Y., a corporation of New York Application November 4, 1955, Serial No. 544,855

1 Claim. (Cl. 179—15)

This invention relates to speech transmission systems which include frequency bandwidth saving devices and particularly to such systems wherein band saving is accomplished by means of time assignment of talk spurts.

With the currently increasing demands for the transmission of speech signals including a relatively broad band of frequencies there arises a problem of the medium which is to e used. It is desirable to make use of existing transmission facilities, but in a great many cases these facilities were not designed for the faithful transmission of such broad band signals. This problem has been overcome by a variety of band saving arrangements. In some of these arrangements certain of the frequencies in the speech signal band are intentionally sacrificed so that the remaining signal frequencies can be transmitted over existing facilities. In others, the original speech signals are converted to speech defining impulses which require a smaller bandwidth than the original signals and the transmitted information is then used at the receiving terminal to synthesize the speech signals. In still another type of band saving arrangement a number of voice signals are applied to a smaller number of broad band transmission paths of appropriate bandwidth by interleaving talk spurts. Patent No. 2,541,932 issued February 13, 1951, to A. E. Melhose describes a time assignment speech interpolation (hereinafter called TASI) system which is an example of the latter type of band saving system.

Time assignment systems operate on the statistical premise that a channel transmitting normal speech signals in one direction is utilized approximately 30% of the time. The TASI system described in the above-identified Melhose patent assigns the available channels to the particular talkers which are active during each instant. Talk spurts from the various talkers are interleaved at the transmitting end of the channels and restored to their respective signal sequences at the receiving end. It is at once apparent that occasionally some of the talk spurts will be "frozen out," unable to obtain a transmission channel, because at that instant all channels are in use. However, since this difficulty usually occurs only during the transmission of a particular letter or syllable, it has been tolerated.

It is an object of this invention to increase the reliability of speech transmission systems which transmit a plurality of broad band signals over narrow band transmission channels.

It is a further object of this invention to eliminate freeze-out periods in speech transmission systems which transmit broad band signals over narrow band transmission channels using time assignment means.

These and other objects of this invention are obtained by dividing the frequencies in each speech signal which is to be transmitted into two different frequency bands. One of these bands includes only enough information to be intelligible and is transmitted directly from the transmitting terminal to the receiving terminal. The other band is transmitted to the receiving terminal through a TASI band saving system. The two bands are combined in the receiving terminal to form the entire original signal.

One feature of this invention is that each talker is at all times provided with a direct transmission channel capable of handling intelligible signals of a reduced bandwidth. The time assignment part of the transmission system also makes TASI channels available to every talker almost all of the time.

It is another feature of this invention that during intervals when there are more talkers than TASI channels the signals from some of the talkers are momentarily decreased to the minimum bandwidth represented by the transmission capabilities of the direct channels, but there is no freeze-out.

Still another feature of this invention is that the use of a partial time assignment and a partial direct system provides a transmission facility with great flexibility with respect to the number of talkers and the band-width of signals that can be transmitted, the flexibility being dependent on the amount and frequency of momentary signal degradation that can be tolerated.

This invention will be more fully understood from the following detailed description of an illustrative embodiment taken in connection with the attached drawing which is a schematic block diagram of a band saving system in accordance with the invention. The signal communication system illustrated in the drawing includes only equipment necessary for one direction of transmission. Facilities for transmitting in the opposite direction would of course be similar. The communication system comprises a transmitting terminal and a receiving terminal connected by any suitable signal transmission system such as the time division multiplex system used in the above-identified Melhose patent.

The signal sources are assumed here to be talkers in a telephone system. Thus in the drawing the telephone transmitters $T_1$ through $T_N$ are connected to a transmitting terminal by the incoming lines 1 through N, and in similar fashion the telephone receivers $R_1$ through $R_N$ are connected to the receiving terminal by outgoing lines 1 through N. The transmission system connecting the two terminals include C channels, each having a frequency response that is insufficient to pass all of the frequencies present in signals that might be received from the talkers. N of these channels are used for direct transmission between terminals and have a frequency response that is sufficient to pass only the frequencies corresponding to a signal having the maximum acceptable signal degradation. The remaining C—N channels are TASI channels and have a frequency response that is sufficient to pass the remaining frequencies in the speech signals. These C—N TASI channels are used to transmit interleaved talk spurts. Band saving results with this arrangement when the sum of the bandwidths of the C channels is less than the sum of the bandwidths of the N signals. The most economical channel utilization results when $N>(C—N)$.

The transmitting terminal comprises a bank 5 of low pass filters, a bank 6 of high pass filters and a TASI sender 7. The receiving terminal comprises TASI receiver 8 and the directional coupling devices $H_1$ through $H_N$. The filters in the banks 5 and 6 separate the frequencies in each of the incoming signals into a low frequency band and a high frequency band. For example, the low pass filters may select signal frequency components up to 800 cycles per second while the filters in the high frequency bank 6 select the remaining signal frequency components above 800 cycles per second. The TASI sender 7 and reeciver 8 may be of the type described in the above-cited Melhose patent, although other time assignment systems may be used. Directional couplers $H_1$ through $H_N$ in the receiving terminals prevent energy from TASI receiver 8 from being coupled back into the direct channels of the transmission system. The couplers can be any of the well known varieties such as hybrid coils.

Signals on the incoming lines 1 through N are applied to the filters of banks 5 and 6. The low frequency band of each signal is transmitted directly through bank 5 and the transmission system to the receiving terminal where it passes through one of the hybrid coils $H_1$ through $H_N$ to the telephone receivers. The high frequency band of each signal is rejected by the filters in the bank 5 and passed by the filters in bank 6 to TASI sender 7. In sender 7 the talk spurts of the N signals are distributed over the C—N channels of the TASI system in miscellaneous interleaved sequences depending upon which signals happen to include talk spurts at any particular instant. The interleaved talk spurts sequences are transmitted to TASI receiver 8 where they are restored to their respective signal sequences as described in the above-identified Melhose patent. The restored talk spurts of the high frequency band of each signal are combined with their respective low frequency components in the hybrid coils $H_1$ through $H_N$ and transmitted from there to the telephone receivers $R_1$ through $R_N$.

Although this invention has been described in connection with one embodiment thereof it should be apparent that other embodiments and modifications within the spirit and scope of the invention will be obvious to those skilled in the signal communication art.

What is claimed is:

A speech transmission system comprising a transmitting terminal with N incoming lines, a receiving terminal with N outgoing lines, C transmitting channels connecting the two said terminals, C being greater than N, each of said C channels having a frequency response less than the bandwidth of any speech signal on one of said lines, low pass filter means connected to each of said incoming lines for transmitting an intelligible band of frequencies from each of said speech signals, means including a different one of said C transmitting channels connecting the output of each of said low pass filter means to one of said outgoing lines, high pass filter means connected to each of said incoming lines for transmitting the remaining band of frequencies from each of said speech signals, talk spurt interleaving means responsive to the presence of signal energy on said incoming lines, means connecting the input of said interleaving means to the output of said high pass filter means, C—N of said transmitting channels connecting the output of said interleaving means to said receiving terminal, said C—N transmitting channels being fewer in number than said N incoming lines, means in said receiving terminal for restoring said interleaved talk spurts to their respective signal component sequences, and means combining said restored talk spurt components with their respective low frequency components.

References Cited in the file of this patent

UNITED STATES PATENTS

| | | |
|---|---|---|
| 2,541,932 | Melhose | Feb. 13, 1951 |
| 2,657,253 | Bedford | Oct. 27, 1953 |
| 2,692,303 | Dickieson et al. | Oct. 19, 1954 |
| 2,696,523 | Theile | Dec. 7, 1954 |